June 2, 1959 — J. A. SAFFIR — 2,888,747

ARTIFICIAL TEETH

Filed Dec. 6, 1955

INVENTOR.
Jacob A. Saffir.

United States Patent Office 2,888,747
Patented June 2, 1959

2,888,747
ARTIFICIAL TEETH

Jacob A. Saffir, Los Angeles, Calif., assignor to The Dentists' Supply Company of New York, York, Pa., a corporation of New York Application December 6, 1955, Serial No. 551,292

6 Claims. (Cl. 32—8)

This invention pertains to artificial teeth and more particularly relates to the anterior teeth.

Numerous attempts have been made, in the past, by tooth manufacturers and dentists to construct artificial teeth to resemble natural living teeth in appearance and characteristics, but despite the most artistic efforts, the results have not been entirely availing or free from objection. Thus artificial teeth afforded by the prior art have generally been distinctly differentiated from that of natural teeth in their appearance, and in addition their properties have not effectively simulated that of natural teeth, particularly with respect to the attendant sound effects, as during speech or mastication.

It is apparent that previous attempts to produce a more natural appearing tooth have not always been successful because of the failure to realize that when a "living" tooth was viewed, the view obtained was affected not only by the light reflected from the superficial surfaces of the tooth but was affected as well by the reflections from its own deepest structures. More over the discrepancy between artificial and natural teeth with respect to various physical properties, such as the aforesaid sound effects, seemingly has not received appropriate consideration in the fabrication of artificial teeth, pursuant to the prior art.

The term "living teeth" as used in this application is meant to apply to teeth that have a vital pulp structure within their interiors. When the pulp no longer functions and has been replaced by a solid, as in root canal therapy, the natural tooth loses some of its luster and color and is referred to as a "dead" tooth.

Often the vital pulp is referred to as the "nerve structure" in a tooth, but this term not being entirely correct, it is not employed in this application. This living pulp in the center of a tooth is a soft, jelly-like mass composed mainly of blood and lymph vessels, nerves and connective tissue.

The pulp cavity is the term applied to the hollow space within a tooth that is occupied by the dental pulp, its outline generally similar to the outline of the tooth.

The principal object of this invention is the obtainment of more natural looking teeth.

Another object is to obtain teeth that will also feel more natural to the wearer.

A further and significant object of this invention is to provide a more natural sounding tooth. This relates primarily to the substantial elimination of the "clicking" sound which is characteristic of artificial teeth during mastication, as well as the sound effect of artificial teeth on speech, and substantially simulating in artificial teeth relevant properties conforming with those of natural teeth.

The attainment of the above and further objects of the invention will be apparent from the following description taken in conjunction with the accompanying drawings forming a part thereof.

Like reference numerals refer to like parts throughout the several views.

For purposes of illustration a central incisor was used in all of the drawings; however, this invention can be applied to any tooth, anterior or posterior, upper or lower. In this connection, it will be understood that the artificial teeth within the purview of the present disclosure may desirably be of a derivation conforming with the usual practice in the art, embracing the use of such materials as ceramics, porcelain or synthetic resins, and adapted to afford the usually desired characteristics of translucency or transparency. However where merely the sound aspects of the present invention are contemplated, the aforesaid properties of translucency or transparency may not be a requisite for the material utilized in fabricating the artificial teeth.

Figure 1:
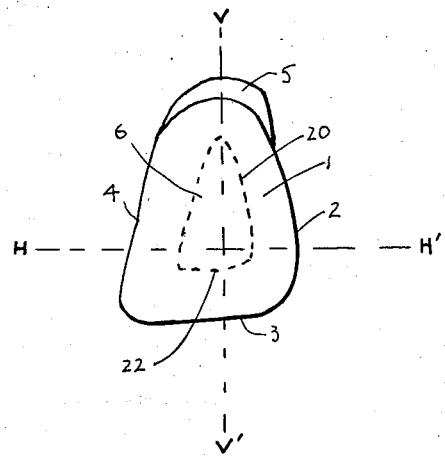
Figure 1 is an elevational view of the labial—front—surface of an upper left central incisor.

Reference may now be had more particularly to Figure 1. This is the labial aspect of an upper left central incisor—that portion of an anterior tooth next to the lips. The labial surface, desirably translucent or transparent, is designated at 1 and at 2 is the distal surface—the surface most distant from the median line of the dental arch when the tooth is in situ.

At 3 is the incisal or cutting surface, at 4 the mesial surface—the closest surface to the median line of the arch and at 5, the gingival or surface closest to the gum or tissues.

The dotted line 20 outlines an area or cavity 6 in the interior or core portion of the tooth which is filled with a gel or jelly-like mass.

The purpose of this insert or core material is to affect the reflected light from the tooth so as to give the tooth a more natural appearance as well as to alter the resonance or sound effects of the tooth so as to greatly deaden or substantially obviate the unnatural sound effects attributable to artificial teeth and to eliminate much of the objectionable "clicking." This latter is a high pitched sound which can often be heard for some distance and serves to call attention to the artificial teeth of the wearer. The said "clicking" is effected primarily during mastication by the contact of an artificial tooth with a supplementary opposing tooth surface.

Many people are made very self-conscious by this embarrassing "click," often to an extent where they withdraw socially, limit their conversations, and hesitate to eat in public places. There are cases where such withdrawal has puzzled other members of the family and worried them into calling in a psychiatrist, but it can be understood that such a "clicking" which can be heard to the annoyance of people in the vicinity, can be noisier and more discomforting to the person producing it since it originates within a few inches of the inner ear.

This central portion 6 of gel tends to absorb and cushion sharp sound effects, attributable to the use of artificial teeth, thereby lowering their pitch and in effect simulating the acoustic properties of natural teeth. In this connection, the pulp or center mass of natural teeth in effect comprises a semi-solid jelly-like mass and is substantially determinative of the sound as well as reflective characteristics applicable to the utilization of natural teeth.

The size of the core may vary. In teeth for young people it should be large and can, in width—mesiodistally—equal up to two thirds the width of the tooth and follow the shape of the tooth. In length—incisogingivally—it may be up to two-thirds of the length of the crown. Its thickness need not be over one third of the thickness of the portion of the tooth it is replacing.

As the age of the patient increases, the core can be made smaller and smaller until it is no more than a narrow slit two to six millimeters in width and two to eight millimeters in length and approximately two millimeters in thickness.

Inasmuch as this filler can influence the final color of the tooth and its reaction to natural and artificial light, it is important to be guided by that consideration in choosing the color of this inset.

The filling materials for the core may be made fluorescent in ultra violet light by adding any of the well known fluorescent producing compounds, as, for example, uranium oxide added to .5%—one-half of one percent—by weight of the core material. The addition of zinc sulphate also causes fluorescence as well as certain dyes, some of which are mentioned later.

Figure 2:
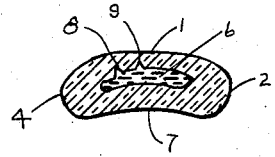
Figure 2 is a sectional view of the central incisor illustrated in Figure 1, taken along lines H—H'.

Figure 2 is a sectional view of the central incisor in Figure 1, taken along the line H—H'. The core 6 is filled with a gel and need not be regular in its outline but can have bulges or points along any margin, as shown at 8 and 9. Because the labial wall of this tooth is translucent, a special line or spot effect will result wherever such bulges or irregularities, 8 and 9, are created.

Figure 3:
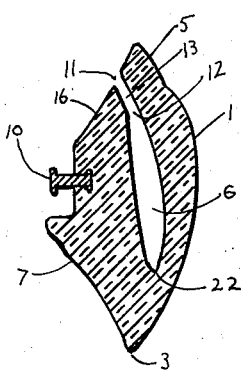
Figure 3 is a sectional view longitudinally of the central incisor illustrated in Figure 1, taken along lines V—V'.

Figure 3 is a sectional view of the central incisor in Figure 1 taken at the lines V—V'. A gingival opening 11 leads through a duct 13, through the core opening 12, into the core 6. In a porcelain tooth, such as this, it is usually best to fill the core with jel, also referred to as gel, after the tooth is complete with the metal retention pins 10. After the core is filled, the duct 13 from the opening 11 to core mouth or opening 12 is filled with any type of sealing cement—organic or inorganic—such as zinc oxyphosphate, or plastic cement, such as the cellulose acetone cements or high fusing waxes or pitches. Or—small porcelain, plastic, wood-like, or metal inserts or wedges can be cemented or screwed into place in the area 13. Any means to keep the core tightly sealed during the processing of the denture and during use, is, of course, satisfactory.

In adjusting these teeth, the dentist must avoid grinding too close or into the core and it is suggested that any such grinding of the incisal, for example, should not pass the point 22 (Figures 1, 3, 4), since this will avoid any necessity for resealing the core, or, as in the case where liquid is apt to be spilled, the replenishment and resealing of liquid core material will be obviated.

In accordance with the indication hereinabove, the core may comprise any non-solid material, desirably non-toxic, which affords the reflective and/or acoustic characteristics applicable to such illustrative substances, exemplified by a liquid, gel, semi-solid mass or the like, when they are enveloped by the body portion of an artificial tooth, as within an internal cavity thereof. The core area or cavity may be filled with the core material at the factory or by the dentist and because it thus becomes possible to affect the color of the tooth by the color of the core material, a large variety of shades is easily manipulatable.

Any coloring solution or paste may be used but the number of possible coloring materials, both dyes and pigments, being so numerable, only a few are mentioned.

For young people's teeth, a bright red—the color of a normal, living, healthy pulp is desirable. A dilute 1/10 to 1% solution of Rhodamine B may be used when a red fluorescence is desired. Safranine Y, 1/10 to 2% also causes a desirable red color. Where a jelly-like core is used and red is desired, either the above or azo oil red may be used. One may also use any of the cadmium selenide reds or vermillion.

For older people it is often desirable to use a reddish brown effect and burnt sienna is a very effective pigment.

Where a slight amount of blue is wanted, a minute amount of methylene blue can be added and where bluish green is desired, methylene green. If green is desired, napthol green may be incorporated; for purple, methyl violet. Eosin may be used where pink is desired, especially for fluorescence as eosin is a fluorescent dye.

Water, alcohol, glycerine, glycerol, liquid petrolatum, acetone, a glycol, and any of the hundreds of solvents suitable for any particular dye or pigment may be used.

The point of caution to be observed, however, is that no chemical or dye should be employed that can cause injury or harm to the mouth or body in the amount present in the core of the tooth if such substance should accidently be spilled in the mouth; e.g., if a tooth were to break during mastication.

Where it is desired to use a paste or jelly to fill the core, a jelly-like medium is to be preferred, such as petrolatum, gelatin, liquids thickened with glass or asbestos fibers or other inert fibers such as nylon, or other plastic fibers, cotton fibers, etc.

Figure 4:
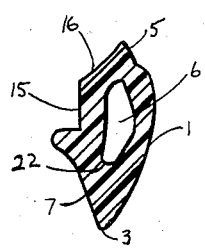
Figure 4 is a longitudinal section of another central incisor.

A cross section of a plastic central incisor is illustrated in Figure 4. The plastic core 6 can be placed in position during processing. If the materials used to form the tooth are polymerizable and the material used to form the core is non-polymerizable—or polymerizes only to the extent of becoming jelly-like—then the tooth molds can be packed at the same time and the core will be permanently fixed in position when the act of polymerization is complete.

If a completely liquid core is desired for a plastic tooth, then the tooth can be constructed as illustrated in Figure 3 or a solid walled capsule of cellophane or similar substance containing the liquid core can be enclosed in the tooth mold prior to curing, as in Fig. 4.

Although I have described a method of practicing my invention I contemplate that numerous and extensive departures may be made therefrom without departing from the spirit of my invention and the scope of the appended claims.

The invention is hereby claimed as follows:

1. An artificial tooth comprising a body portion enveloping a cavity internally thereof and a core material sealed within said cavity, said core material being adapted to afford sound-reflective characteristics simulative to a natural tooth in use, said core material consisting of a gel.

2. An artificial tooth comprising a body portion enveloping a cavity internally thereof, said body portion being light-translucent and a core material sealed within said cavity, said core material being adapted to afford sound and light-reflective characteristics simulative of a natural tooth in use, said core material consisting of a gel.

3. An artificial tooth comprising a body portion enveloping a cavity internally thereof, at least the outer surface of the body portion being light-translucent, and a core material sealed within said cavity, said core material being adapted to afford sound and light-reflective characteristics simulative of a natural tooth in use, said core material consisting of a gel.

4. An artificial tooth comprising a body portion enveloping a cavity internally thereof, said cavity having an opening at a surface of said body portion, a core material within said cavity, said core material being adapted to afford sound and light-reflective characteristics simulative of a natural tooth in use, said core material consisting of a gel, and said opening being provided with means therein for sealing the same to thereby hermetically enclose the core material.

5. An artificial tooth as in claim 4, wherein at least the outer surface of the body portion is light-translucent.

6. An artificial tooth as in claim 3, wherein the core material comprises a gel of predetermined coloration.

References Cited in the file of this patent

UNITED STATES PATENTS

| | | |
|---|---|---|
| 589,383 | Dennett | Aug. 31, 1897 |

FOREIGN PATENTS

| | | |
|---|---|---|
| 1,047,362 | France | July 22, 1953 |